United States Patent
Becker et al.

(10) Patent No.: US 11,193,512 B2
(45) Date of Patent: Dec. 7, 2021

(54) METHOD FOR VIBRATION DAMPING FOR HYDRAULIC LIFTING MECHANISMS OF MOBILE WORKING MACHINES AND HYDRAULIC LIFTING MECHANISM HAVING VIBRATION DAMPING

(71) Applicant: Robert Bosch GmbH, Stuttgart (DE)

(72) Inventors: Gernot Becker, Stuttgart (DE); Quang Huy Nguyen, Stuttgart (DE); Steffen Rose, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 22 days.

(21) Appl. No.: 16/429,157

(22) Filed: Jun. 3, 2019

(65) Prior Publication Data

US 2019/0373799 A1    Dec. 12, 2019

(30) Foreign Application Priority Data

Jun. 7, 2018   (DE) .................... 10 2018 209 073.4

(51) Int. Cl.
*F15B 21/00* (2006.01)

(52) U.S. Cl.
CPC .................... *F15B 21/008* (2013.01)

(58) Field of Classification Search
CPC ................ F15B 21/008; F15B 2211/8616
See application file for complete search history.

(56) References Cited

U.S. PATENT DOCUMENTS

| 5,471,504 A | * | 11/1995 | Lee | .................. H04L 25/03057 375/229 |
| 8,099,196 B2 | * | 1/2012 | Keintzel | .................. F15B 9/09 700/281 |
| 2016/0298719 A1 | * | 10/2016 | Wang | .................. E02F 9/2207 |

* cited by examiner

*Primary Examiner* — F Daniel Lopez
(74) *Attorney, Agent, or Firm* — Maginot, Moore & Beck LLP

(57) ABSTRACT

There are disclosed a method and a lifting mechanism for actively damping in mobile working machines vibrations which may occur as a result of raised attachments during travel. The method or the lifting mechanism has a prediction or a predictor for estimating the future vibration. The prediction is preferably carried out with a recursive least squares algorithm. The mobile working machine may, for example, be a tractor.

10 Claims, 4 Drawing Sheets

METHOD FOR VIBRATION DAMPING FOR HYDRAULIC LIFTING MECHANISMS OF MOBILE WORKING MACHINES AND HYDRAULIC LIFTING MECHANISM HAVING VIBRATION DAMPING

This application claims priority under 35 U.S.C. § 119 to application no. DE 10 2018 209 073.4, filed on Jun. 7, 2018 in Germany, the disclosure of which is incorporated herein by reference in its entirety.

TECHNICAL FIELD

The disclosure relates to the active vibration damping of mobile working machines, to the hydraulic lifting mechanism of which an attachment is coupled.

BACKGROUND

The electrohydraulic lifting mechanism control for mobile working machines, for example, tractors in agricultural technology, has been established for years. The main tasks of the lifting mechanism control are, on the one hand, to achieve a uniform working depth of an attachment which is articulated or coupled to the lifting mechanism during working operation, for example, a plow, on the other hand, to compensate for or damp the vibrations which occur during travel operation of the overall system which comprises the mobile working machine and the attachment. As a result of the nature of the travel surface and the driving maneuvers, the overall system is caused to vibrate, for example, during travel on roads over bumps. The vibration characteristic of the overall system is influenced significantly by the geometry and the weight of the attachment.

In this instance, in order to prevent the front wheels of the mobile working machine from losing contact with the ground and the mobile working machine consequently temporarily not being able to be steered, as a result of an active actuation of the lifting mechanism, the attachment is used for vibration damping.

In current lifting mechanism control systems of tractors, there are used according to the prior art force measurement pins which depending on the size of the tractor are installed in the lower links or the upper link. These measure directly the bearing force which occurs in a horizontal direction, which corresponds to the tensile force during working operation, by means of which the tractor pulls the attachment. During travel operation, the attachment also applies as a result of its mass and geometry a force to the lifting mechanism. Vibrations which occur during travel operation can be identified as a result of changes of the measured force in the lower links or the upper link. As a result of the active actuation of the lifting mechanism, it is possible to respond to the force peaks which occur. This leads to a calming of the overall system.

The active vibration damping is often superimposed with a bearing control so that the position or the height of the attachment changes only within specific tolerances.

The disadvantage of such an active vibration damping involves its constantly reactive nature and the resultant residual vibrations of the overall system.

SUMMARY

An object of the present disclosure is to provide a method and a lifting mechanism with improved active vibration damping.

This object is achieved by a method for active vibration damping for hydraulic lifting mechanisms of mobile working machines having the features of the disclosure and by a hydraulic lifting mechanism for mobile working machines having the features of the disclosure.

Other advantageous embodiments of the disclosure are described in the detailed embodiments.

With the method according to the disclosure, an active vibration damping is carried out by means of a lifting mechanism of a mobile working machine, to which mechanism an attachment is coupled. The method relates to the control of the hydraulic actuators of the lifting mechanism, preferably at least one lifting cylinder, and is proactive according to the disclosure. It has the following steps which are carried out repeatedly:
  establishing or measuring the current vibration,
  precalculating the future vibration and
  controlling the lifting mechanism in accordance with the future vibration.

The vibration may be a vibration of the attachment with respect to the mobile working machine. It may, for example, be based on an inevitable resilience of the lifting mechanism. The vibration may also affect the overall system comprising the mobile working machine and attachment. In this instance, the vibration may be carried out about a rear axle of the mobile working machine, that is to say, on the one hand, a pivoting of the attachment and, on the other hand, a pivoting of a front of the mobile working machine about the rear axle. The vibration may also be a swinging up and swinging down of the overall system based on the resilience of the rear tires of the mobile working machine. In practice, a plurality of these vibration types are usually superimposed.

The use according to the disclosure of a prediction algorithm enables, by predicting the vibration path of the overall system, compensation for the phase shift between the control and lifting mechanism movement. A time optimized control of the lifting mechanism is thereby enabled and the vibrations of the overall system which occur or which are being developed are further reduced with respect to the reactive vibration damping of the prior art.

The predictive vibration damping according to the disclosure can be integrated in existing lifting mechanism control systems as an add-on solution.

In order to achieve the same quality of vibration damping, in methods with prior calculation according to the disclosure it is possible to use components which are more cost-effective compared with the prior art, for example, only one additional software module or one software update. A sensor (which may, for example, be a sensor for force measurement or a camera) is further required to measure the vibrations which occur since the natural frequency of the overall system comprising the mobile working machine and attachment changes as a result of the use of different attachments and where applicable different loads. Furthermore, the method enables very low integration costs.

As a result of the prediction of the vibration path according to the disclosure, the phase shift between control and actual reaction of the lifting mechanism is compensated for. This leads to an improvement of the vibration damping. In particular with lifting mechanisms which require no sensor for direct force measurement, for example, force measurement pins, the greater phase shift resulting from the principle involved can advantageously be compensated for by the vibration damping according to the disclosure.

The compensation for the phase shift between the control and lifting mechanism movement enables the use of alternative control concepts which require no sensor for direct force measurement in order to reduce the system costs. The disadvantages resulting from the principle involved can in this manner be compensated for.

Preferably, the prior calculation is based on a recursive least squares algorithm.

It is preferable to use a learning algorithm which learns the vibration properties (in particular natural frequency) of the overall system online and provides the prediction algorithm therewith. For a system availability which is independent of configuration, a corresponding system adaptation is therefore required.

In practice, the overall system is always excited to vibrations at the natural frequency thereof. This is dependent on different parameters such as, for example, weight and geometry, of the mobile working machine, the attachment and the ballast weight. In a particularly preferred development of the method according to the disclosure, the natural frequency of the overall system is therefore determined by means of a short "learning phase". This means for the vibration damping that the phase shift which is produced as a result of the effect chain between the control and actual reaction of the hydraulic lifting mechanism (control of valves, pivoting out of a pump, pressure build-up, movement of at least one lifting cylinder) can be compensated for.

According to a first embodiment, the method is carried out with a closed control circuit.

There is preferably carried out an offline calculation of a transfer function of the control circuit. Consequently, the performance of the method according to the disclosure can be further improved.

Preferably, there is carried out a determination of a phase displacement of the control circuit. Consequently, the performance of the method according to the disclosure can be further improved.

In this case, the method preferably has the following additional step: determining a prediction time depending on the update rate based on the established phase displacement. As a result, the performance of the method according to the disclosure can be further improved.

According to an embodiment, the method has the following additional step: carrying out a feed forward inversion of the closed control circuit. As a result, the performance of the method according to the disclosure can be further improved.

The method preferably has the following additional step: modifying properties of an adaptive controller in accordance with the process dynamic. As a result, the performance of the method according to the disclosure can be further improved.

The method preferably has the following additional step: carrying out an online parameter estimation of the closed control circuit in real time. As a result, the performance of the method according to the disclosure can be further improved.

The implementation of the online parameter estimation of the closed control circuit is preferably based on a prediction algorithm which carries out a stable inversion of an estimated model. Consequently, the performance of the method according to the disclosure can be further improved.

The disclosed lifting mechanism is configured for a mobile working machine or assembled thereon. It is used for active vibration damping of an attachment which is articulated or coupled to the lifting mechanism or an overall system which comprises the mobile working machine and the attachment. According to the disclosure, the lifting mechanism has a device for establishing or measuring a current vibration and a predictor which is used as a prognosis device for precalculating a future vibration. Preferably, the predictor is based on a recursive least squares algorithm.

The compensation for the phase shift between the control and movement of the lifting mechanism according to the disclosure enables the use of alternative control concepts which in order to reduce the system costs require no sensor for direct force measurement. Disadvantages relating to the principle can in this manner be compensated for.

The measurement device for establishing or measuring the current vibration may be a camera or a sensor for direct force measurement, for example, a force measurement pin.

In a preferred development, the lifting mechanism according to the disclosure has a summation member, via which an output signal of the predictor and an output signal of an operating element of the mobile working machine can be added.

The above-mentioned developments of the method according to the disclosure are also preferred developments of the lifting mechanism according to the disclosure.

BRIEF DESCRIPTION OF THE DRAWINGS

A plurality of embodiments of the method according to the disclosure or the lifting mechanism according to the disclosure for active vibration damping in mobile working machines with a lifting mechanism are illustrated in the Figures.

In the drawings.

DETAILED DESCRIPTION

Figure 1:
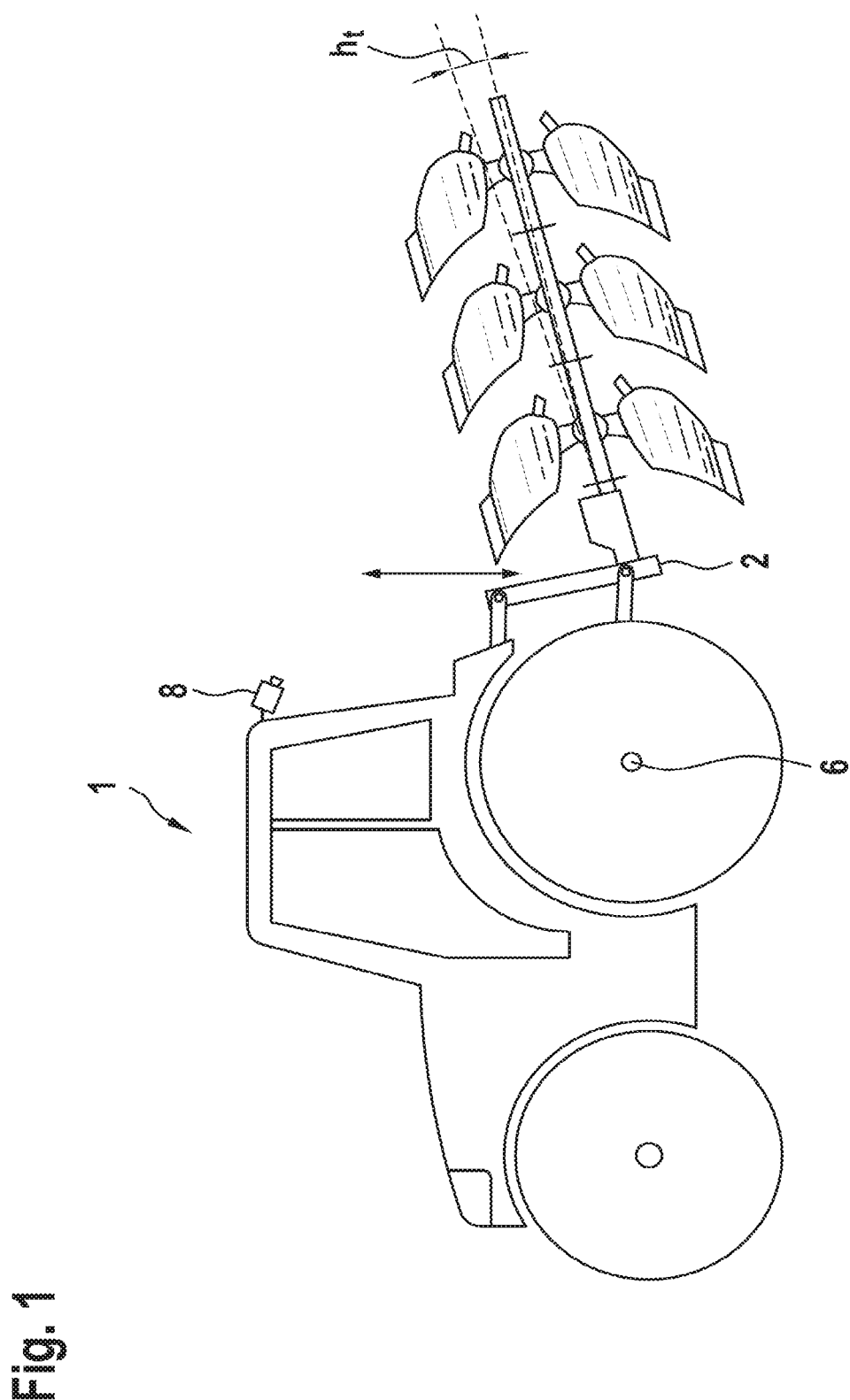
FIG. 1 shows a mobile working machine and the vibration of an attachment with respect to the mobile working machine during the vibration damping according to the disclosure.

FIG. 1 shows a mobile working machine 1, in this example a tractor, having a control according to the disclosure for vibration damping by means of the lifting mechanism 2 thereof. An attachment 4, in this example a plow, is coupled or articulated to the lifting mechanism 2.

When the attachment 4 is raised and the mobile working machine 1 travels over bumps, the attachment is excited to an undesirable vibration $h_r$ which is, for example, a pivot movement about a rear axle 6 of the mobile working machine 1.

The predictive vibration damping according to the disclosure may be implemented as a pure software module in the existing lifting mechanism 2. Therefore, the use of a predictive vibration damping in the lifting mechanism 2 in order to increase the performance and to further reduce the vibrations $h_r$ which occur during travel operation is possible without expanding the hardware. The subsequent expansion of existing systems for vibration damping by means of a software update is thereby possible.

In the alternative control concept of the existing lifting mechanism 2 in question here, which dispenses with the direct measurement of the force in the lifting mechanism bearing, the phase shift in the effect chain is in principle in most cases greater. Resultant performance losses with the vibration damping according to the prior art are compensated for by the predictive vibration damping according to the disclosure. As a result of the greater phase shift in the effect chain, the potential of the predictive vibration damping according to the disclosure is high.

In order to predict the vibration $h_t$ of the attachment 4, a recursive least squares algorithm is used to estimate the future vibration $h_{t+1}$. There can be used as an input signal the signals of different sensors which enable a conclusion relating to the vibration movement. In the embodiment shown, this sensor is a camera 8 and/or pressure sensors in the hydraulic cylinders (both not shown) of the lifting mechanism 2.

Based on a direct or indirect measurement of the force in the lifting mechanism 2 and the dynamic change thereof brought about by the vibration $h_t$, the active precontrol for compensation for the phase shift in the effect chain is explained below.

With reference to the superimposed vibrations of the measured force path in the lifting mechanism, the learning algorithm learns the vibration properties (for example, natural frequency, spectrum) of the overall system in the current system configuration. Based on the estimated vibration properties, the force path in the lifting mechanism 2 can be predicted a short time $\Delta t$. The requirement for this is a periodic path of the vibrations. For control of the lifting cylinders, the predicted force path is used as a basis. There is thereby also produced a time displacement of the control by $\Delta t$. The control runs ahead of the actual force path. The optimal prediction time $\Delta t$ must in this instance correspond to the duration of the effect chain from the control to the actual movement of the lifting mechanism 2. The phase shift of the active chain can be determined from the established transfer function and the natural frequency at which the overall system vibrates. The reaction of the lifting mechanism 2 can consequently be carried out at the optimum time for the vibration damping. The greater the phase shift in the effect chain between the control and lifting mechanism movement is, the greater is the potential for a precontrol based on the prediction according to the disclosure. The phase shift is influenced by all the components involved in the control circuit, such as the sensor, the data transmission, the controller and the mechanical components.

Figure 2:
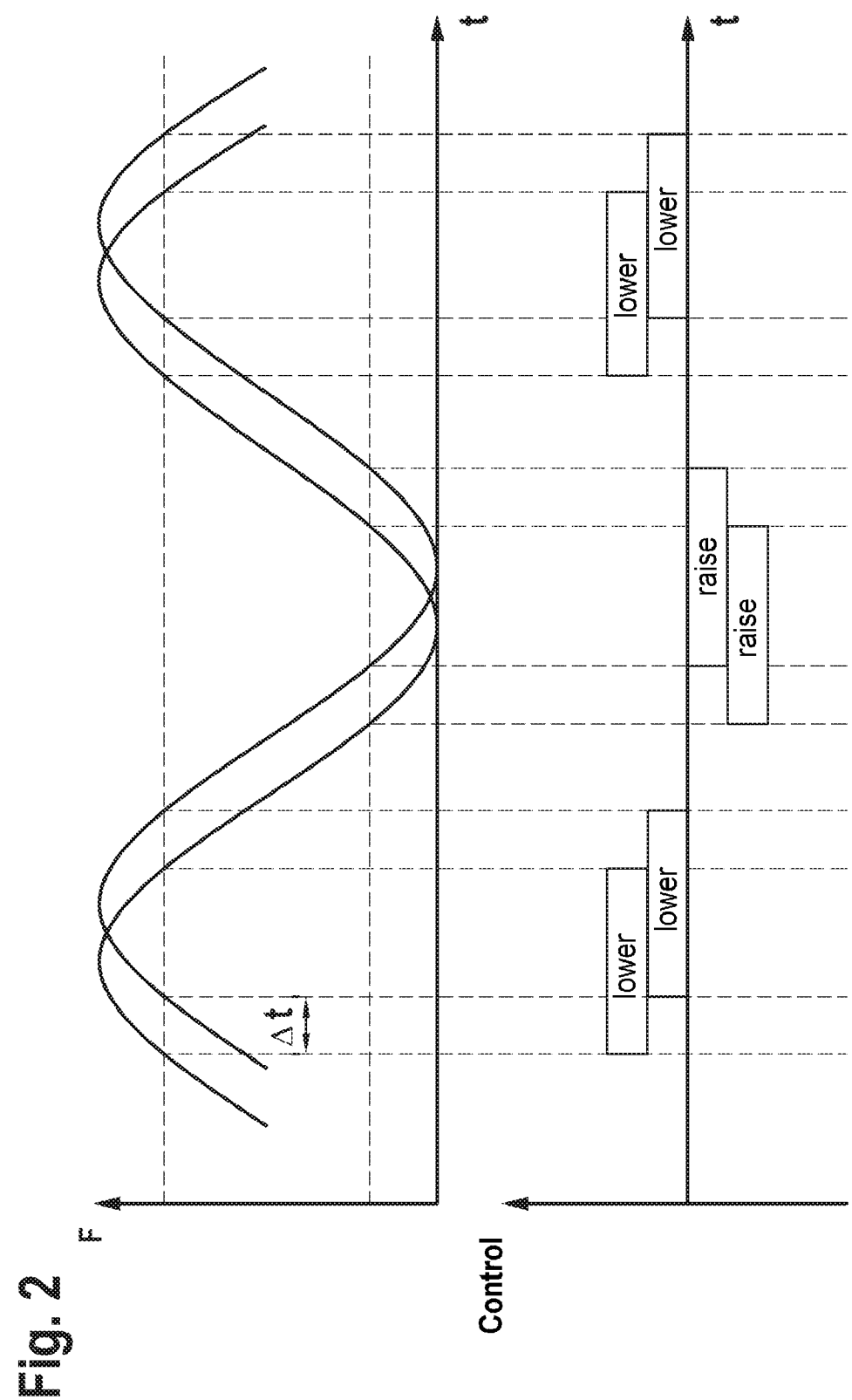
FIG. 2 shows the temporal offset of a control of the lifting mechanism based on the predicted force path.

FIG. 2 shows the temporal offset of the control of the lifting mechanism 2 based on the predicted force path F. Both values are to this end plotted against time t.

Figure 3:
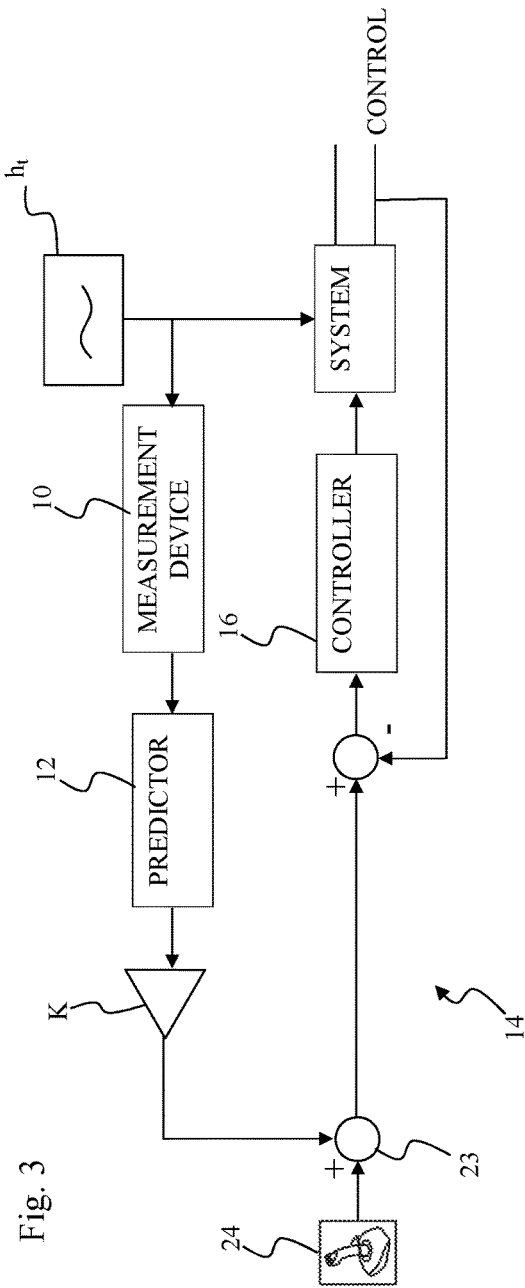
FIG. 3 is a circuit diagram of a first embodiment of the method according to the disclosure.

According to FIG. 3, the vibration $h_t$ of the overall system at the time t is measured by a measurement device 10 and used as an input value for estimating the future vibration $h_{t+1}$. The estimation is based on a recursive least squares (RLS) algorithm.

For estimation, a linear model θ

$$h_{t+1} = \vec{h_t}^T \cdot \vec{\theta}_t$$

is used, wherein the measurement data vector $\vec{h_t}^T$ comprises N measurements up to the time t, and where $\vec{\theta}$ are the coefficients.

First, the so-called Kalman amplification vector $$\vec{K}_t = \frac{P_{t-1} \cdot \vec{h}_{t-1}}{\lambda + \vec{h}_{t-1}^T P_{t-1} \vec{h}_{t-1}}$$

is calculated, where $\lambda(0 \leq \lambda \leq 1)$ is the so-called forgetting factor and $P_t$ is the inverse correlation matrix of the measurement data.

The a priori error ∈ between the actual measurement value $h_t$ and the estimated value $h_{t+1}$ is subsequently determined as $$\varepsilon_t = h_t - \vec{h}_{t-1}^T \vec{\theta}_{t-1}$$

The coefficients $\theta_t$ are updated with reference to the equation $$\vec{\theta}_t = \vec{\theta}_{t-1} + \vec{K}_t \varepsilon_t$$

and the inverse correlation matrix $P_t$ with reference to $$P_t = \frac{P_{t-1} - \vec{K}_t \vec{h}_{t-1}^T P_{t-1}}{\lambda}$$

Subsequently, an estimation of the vibration $h_{t+1}$ or the measurement values is calculated at a time t+n. To this end, a new measurement data vector of corresponding length is iteratively produced and multiplied by the coefficient vector $\vec{\theta}$.

$$h_{t+n} = (h_{t-N+n-1}, h_{t-N+}, \ldots, h_{t+n-1}) \cdot \vec{\theta}_t$$

An existing controller 16, which is in the embodiment shown constructed as a PID controller, enables an improved performance by incorporating future information relating to the vibration. Accordingly, the expanded structure is divided into a "prediction of the vibration" and an "active precontrol".

The performance of the active vibration damping is determined significantly by the delay of the closed control circuit 14, which is influenced by the controller 16, the characteristic of the mechanical components which are installed in each case and the signal delays as a result of the measurement device 10 (bus delays, update times, etcetera).

By using a predictor 12 in the precontrol, a damping of these delays of the closed control circuit 14 can be carried out by means of a suitable prediction horizon.

The property of the predictor 12 brings about a periodic path of the input variable or vibration $h_t$ in order to be able to make the most precise prediction possible $h_{t+1}$. This is determined by the characteristic of the vibration $h_t$.

In order to establish the optimum prediction time, an offline transfer function of the closed control circuit 14 is carried out. Furthermore, at the known dominant frequency or natural frequency of the vibration $h_t$, the phase shift of the closed control circuit 14 is determined. Based on the established phase shift, the prediction time is determined in accordance with the update rate.

The sum of the predicted future vibration $h_{t+1}$ formed by a summation member 23 and a user command of an operating element 24 constitutes the input of the system for active vibration damping according to the prior art. The inner structure of the lifting mechanism of the prior art does not have to be changed.

In addition to the above-described method, the performance can be additionally improved using a feed forward inversion of the control path.

Figure 4:
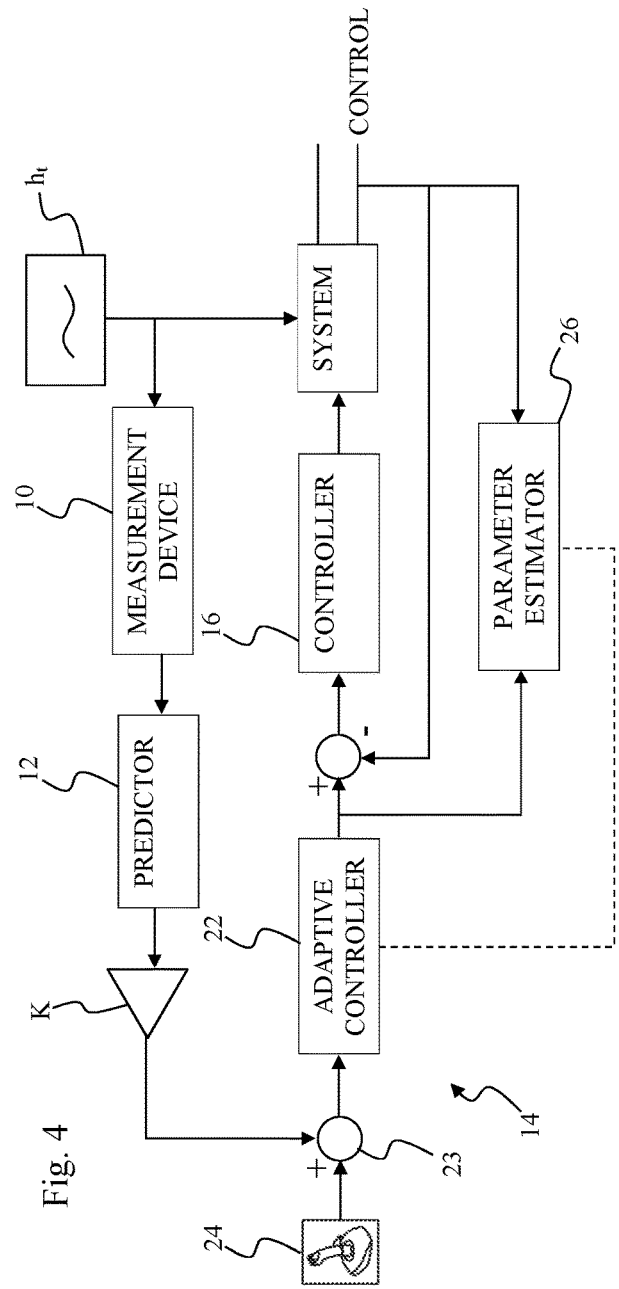
FIG. 4 is a circuit diagram of a second embodiment of the method according to the disclosure.

A disadvantage of the above-described method involves the requirement for an offline phase delay analysis which is solved by an expansion according to FIG. 4.

An adaptive controller 22 modifies its properties in accordance with the process dynamic and the characteristic of the vibration $h_t$. The adaptation process requires an additional online parameter estimation using a parameter estimator 26 of the closed control circuit 14 in real time. The parameter estimator 26 is based on a prediction algorithm which carries out a stable inversion of the estimated model. The predicted vibration information is also included in the calculation of the correcting variable of the adaptive controller.

There are disclosed a method and a lifting mechanism 2 for actively damping in mobile working machines 1 vibrations which may occur as a result of raised attachments 4 during travel. The method or the lifting mechanism 2 has a prediction or a predictor 12 for estimating the future vibration $h_{t+1}$. The prediction is preferably carried out with a recursive least squares algorithm. The mobile working machine may, for example, be a tractor, a wheel loader or an excavator.

Figure 5:
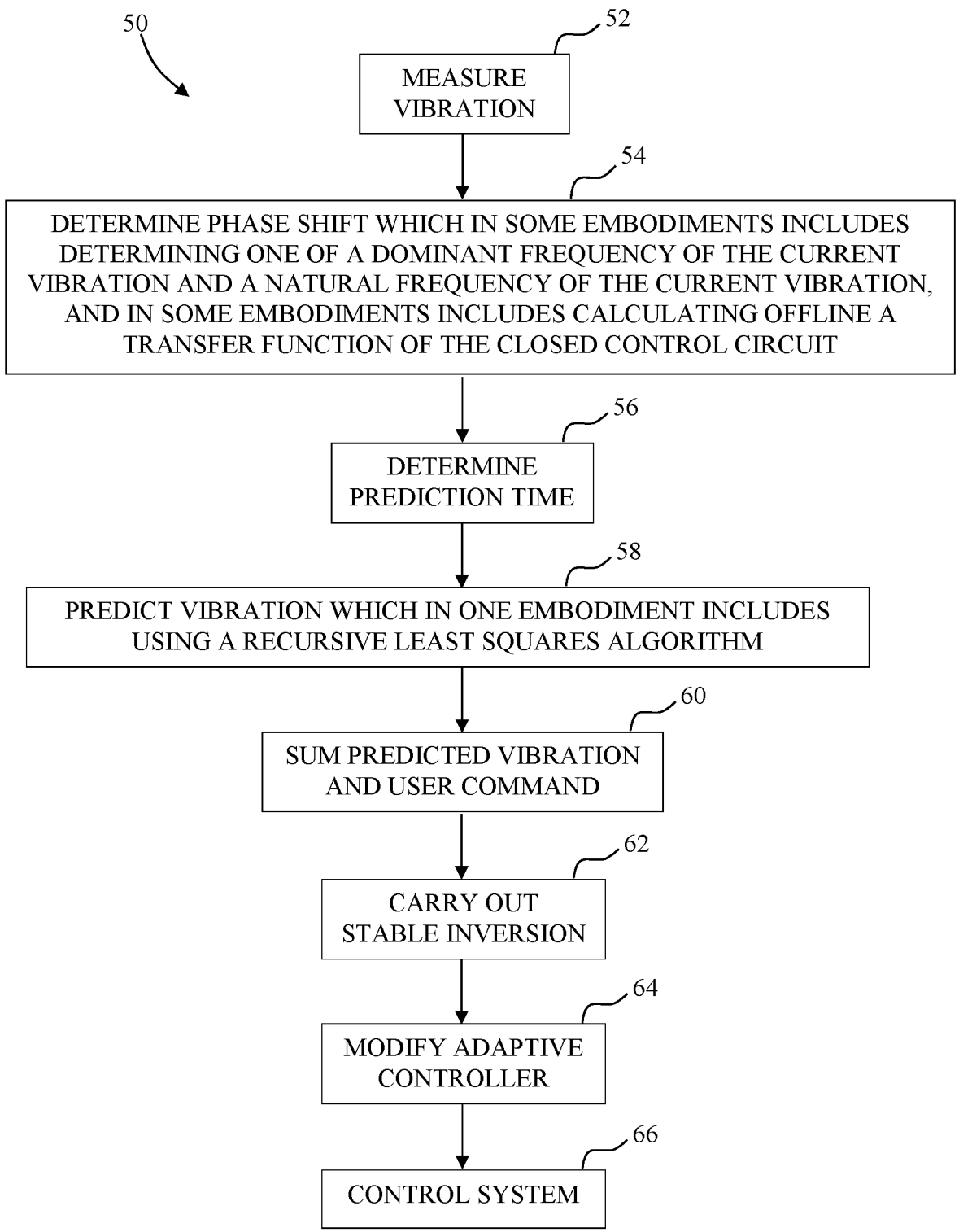
FIG. 5 is a flow chart of a method according to the disclosure.

A method is carried out in one embodiment in accordance with the process 50 shown in FIG. 5. At block 52 a current vibration is measured. At block 54, a known dominant frequency or natural frequency of the vibration $h_t$ is used to determine the phase shift of the closed control circuit 14 and at block 56 an offline transfer function of the closed control circuit 14 is used to determine an optimum prediction time. At block 58 a present vibration is used in the prediction of an estimated vibration. In one embodiment the prediction is based upon a recursive least squares algorithm. The summation member 23 sums the predicted future vibration $h_t+1$ and a user command of an operating element 24 at block 60 and provides the sum to the adaptive controller 22. At block 62 a stable feed forward inversion of an estimated model is carried out by the parameter estimator 26 using a prediction algorithm to estimate an online parameter. The estimate of the online parameter is done in real time and used along with the sum to modify properties of the adaptive controller 22 at block 64. Output from the adaptive controller is then used by a controller to control the system at block 66.

What is claimed is:

1. A method for active vibration damping for a hydraulic lifting mechanism of a mobile working machine, an attachment being coupled to the hydraulic lifting mechanism, the method comprising:
    measuring a current vibration;
    predicting a future vibration with a predictor using the current vibration multiplied by coefficients determined using a Kalman amplification vector and an a priori error between the current vibration and an estimate of the current vibration;
    generating an output signal with the predictor based upon the predicted future vibration;
    summing with a summation member the output signal of the predictor and an output signal of an operating element; and
    controlling the hydraulic lifting mechanism based on the summed output signals of the predictor and of the operating element.

2. The method according to claim 1, the predicting further comprising:
    predicting the future vibration based on a recursive least squares algorithm.

3. The method according to claim 1 further comprising:
    determining one of (i) a dominant frequency of the current vibration and (ii) a natural frequency of the current vibration.

4. The method according to claim 1, wherein the method is carried out with a closed control circuit.

5. The method according to claim 4 further comprising:
    calculating, offline, a transfer function of the closed control circuit.

6. The method according to claim 4 further comprising:
    determining a phase shift of the closed control circuit.

7. The method according to claim 1, further comprising:
    providing the summed output signals of the predictor and of the operating element to a controller, wherein controlling the hydraulic lifting mechanism based on the summed output signals comprises:
    controlling the hydraulic lifting mechanism based on the summed output signals of the predictor and of the operating element with the controller.

8. A lifting mechanism of a mobile working machine, the lifting mechanism comprising:
    a sensor configured to measure a current vibration of an attachment coupled to the lifting mechanism;
    a predictor configured to predict a future vibration of the attachment using the current vibration multiplied by coefficients determined using a Kalman amplification vector and an a priori error between the current vibration and an estimate of the current vibration; and
    a summation member configured to sum an output signal of the predictor and an output signal of an operating element.

9. The lifting mechanism according to claim 8, wherein the lifting mechanism is configured to use the summed output signals of the predictor and of the operating element to control the lifting mechanism.

10. The lifting mechanism of claim 8, further comprising:
    a controller configured to receive the summed output signals of the predictor and of the operating element and control the lifting mechanism based on the summed output signals of the predictor and of the operating element.

* * * * *